Dec. 23, 1969  W. P. EWALD  3,485,561
METHOD FOR ALIGNING THE SURFACES OF TWO SPACED MEMBERS
Filed Aug. 28, 1967

WILLIAM P. EWALD
INVENTOR.

BY Gary D. Fields
Robert W Hampton

ATTORNEYS

United States Patent Office 3,485,561
Patented Dec. 23, 1969

3,485,561
METHOD FOR ALIGNING THE SURFACES OF TWO SPACED MEMBERS
William P. Ewald, Rochester, N.Y., assignor to Eastman Kodak Company, Rochester, N.Y., a corporation of New York
Filed Aug. 28, 1967, Ser. No. 663,854
Int. Cl. G01b *11/26;* G01c *1/00*
U.S. Cl. 356—154                                    3 Claims

ABSTRACT OF THE DISCLOSURE

The method of aligning the surfaces of two spaced members which are normally parallel, is accomplished by holding a small mirror against the two members so that a vertical line support is provided at one member and a point support or contact at the other member. By pivoting the mirror, the point and line contacts will reverse allowing an angular deflection of the mirror. A light beam is projected onto the mirror and reflected onto a screen which may have a scale so that misalignment can be detected by the beam deflection when the mirror is pivoted.

BACKGROUND OF THE INVENTION

This invention relates to a method of aligning the surfaces of two spaced, generally parallel members. The invention finds particular utility in the alignment of the heads of a tape recorder with a capstan shaft. The use of mirrors to measure alignment aberrations or to measure deformities in planar surfaces is well known. For example, there are devices which project a light beam onto a mirror that is rotated in response to misalignment, the reflected beam being projected onto a scale. However, in no instance does the prior art disclose a device or method for detecting misalignment of two generally parallel members, such as the misalignment of the heads of a tape recorder with the capstan shaft.

SUMMARY OF THE INVENTION

This may be accomplished by a novel method wherein the generally rectangular mirror is held against the two spaced members to be aligned so that the mirror engages one member in a line contact and the other member in a point contact. A light beam is projected onto the mirror and reflected onto a screen which may have a scale thereon. By pivoting the mirror so that the point and line contacts reverse, with respect to the two members, the mirror will rotate through a small angle causing a deflection of the light beam on the scale so that this misalignment can be detected. Conveniently, the two members then may be aligned so that no deflection can occur or so that this deflection is within tolerable limits.

Additional advantages of this novel method will become apparent from a description which follows, taken in conjunction with the accompanying drawings.

DESCRIPTION OF THE PREFERRED EMBODIMENT

Figure 1:
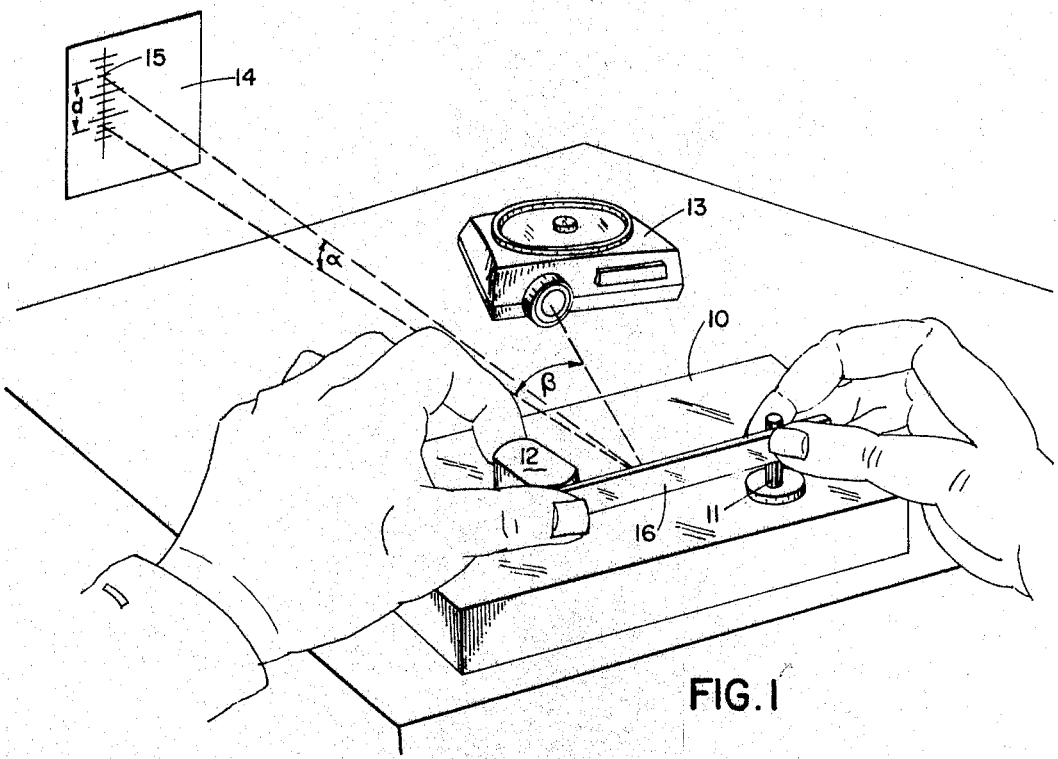
FIG. 1 is a diagrammatical perspective view showing the utilization of the novel method of detecting misalignment of a recording head of a tape recorder with a capstan shaft.

In accordance with this invention, a tape recorder head having a capstan shaft 11 is shown in FIG. 1 wherein one or more of the recording heads, such as recording head 12, is misaligned, i.e., the surface of the head across which the tape moves is not in the same plane as the surface of the capstan shaft. A projector 13 is provided which projects an image to a screen 14 having a scale 15 after being reflected from flat or planar mirror 16, which is illustrated as being generally rectangular and relatively narrow. This mirror is held against capstan shaft 11 and recording head 12 by the hands of the operator, as shown.

Figure 2:
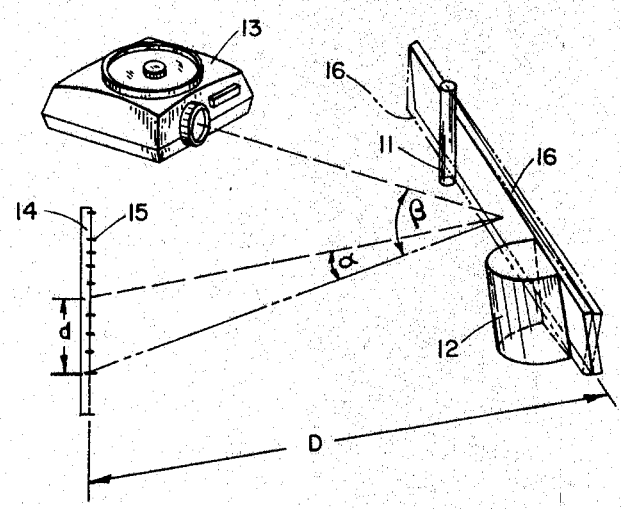
FIG. 2 is a diagrammatical perspective view, taken from the left side of FIG. 1 showing the manner in which the mirror is pivoted, thereby deflecting a light beam so that misalignment may be detected.

If the capstan shaft 11 and head 12 are misaligned, as shown in FIG. 2, the mirror 16 will engage one of them in a line contact and the other in a point contact since the surfaces are not in the same plane. For example, in FIG. 2 the mirror engages recording head 12 in a line contact and capstan shaft 11 in a point contact. However, by manipulating mirror 16 with the fingers, it may be pivoted so that it engages the capstan shaft 11 in a line contact and recording head 12 in a point contact, as shown in dotted lines, causing the projected image, which is reflected onto scale 15, to be deflected through a small angle $\alpha$. These line and point contacts lie along an axis in the surface of each member. When the members are properly aligned, the surfaces will be in the same plane and these axes will be parallel.

Assuming the mirror to be 0.250 inch wide, the amount of alignment here per 0.250 inch height will be determined by measuring the deflection $d$ along scale 15 and the distance from the mirror to the screen D. Calling the error $e$, then:

$$\frac{e}{0.250} = \frac{\frac{d}{2}}{D}$$

$$e = \frac{0.250 \times \frac{d}{2}}{D}$$

$$= \frac{0.125d}{D}$$

It will be noted that $d$ is divided by 2 since the deflection of the reflected beam is being measured. Since a deflection of 0.032 inch can be readily seen, assuming a distance D of 20 feet, an error of 0.00001 inch can be detected and actually measured, if desired. These figures are based on the assumption that angle $\beta$ is relatively small, such as less than 30°. Otherwise, a small error will occur in the measurement of the amount of misalignment. However, it is usually necessary only to detect the misalignment, if any, and not to measure it except to be sure that it is within tolerable limits.

The system can be made more compact and convenient by folding the beam once more and projecting upon a rear-projection translucent screen immediately in front of the operator. In folding the system, the beam may also reflect two or more times from the deflecting mirror thereby multiplying the deflection on the screen so that even more precise alignment may be obtained. Of course, it will be readily understood that once the deflection is measured, the recording head and capstan shaft may be aligned so that no deflection occurs or so that the deflection is within tolerable limits to provide adequate alignment.

It will be understood that this method is useful in aligning normally parallel axes, each lying in the surface of two spaced members, but the center axes of the two members may or may not be in alignment. This is true because the surfaces of the two members may be irregular and/or their center axes may converge or diverge and still be in the same plane. Stated another way, the method is useful in aligning the portion of the surfaces of two spaced members which normally lie in the same plane.

From the foregoing, it can be seen that the novel features of this invention have been fulfilled to a marked degree. A very simple and inexpensive method has been provided whereby the misalignment of two members, such as a capstan shaft and recording head, may be measured by projecting a narrow light beam onto a mirror which is pivoted from a position wherein it is in point contact with one of the members to be aligned and in line contact with the other member to be aligned to a position wherein the pivot point and the line contact reverse. The deflection of this light beam may be projected onto a screen and measured, such as by a scale placed thereon.

Although the invention has been described in considerable detail with reference to a preferred embodiment thereof, it will be understood that variations and modifications can be effected within the spirit and scope of the invention as described hereinabove and as defined in the appended claims.

I claim:

1. A method for detecting misalignment of normally parallel axes, each lying in a surface of one of two spaced apart members, comprising the steps of:

positioning a planar mirror in line contact with the surface of one of said members and in point contact with the surface of the other of said members;

projecting an image onto a screen after being reflected from said mirror; and pivoting said mirror so that said mirror is in line contact with said surface of said other of said members and in point contact with said surface of said one of said members to deflect said reflected image on said screen to indicate misalignment of said axes.

2. A method, as set forth in claim 1, wherein said screen includes a scale and including the further step of:

measuring the amount of misalignment of said axes by the deflection of said reflected image along said scale.

3. A method for detecting misalignment of surfaces of two spaced members, said surfaces normally lying in the same plane, comprising the steps of:

placing a flat mirror in line contact with one of said surfaces and in point contact with the other of said surfaces;

projecting an image onto a screen after reflection from said mirror; and reversing said line and point contacts to rotate said mirror to deflect said reflected image on said screen to indicate misalignment of said surfaces.

References Cited

UNITED STATES PATENTS

| | | | |
|---|---|---|---|
| 2,500,726 | 3/1950 | Westhaver | 356—154 |
| 2,602,326 | 7/1952 | Russenberger | 356—154 |
| 2,811,074 | 10/1957 | Davidson | 356—154 |

RONALD L. WIBERT, Primary Examiner

JEFF ROTHENBERG, Assistant Examiner